Oct. 27, 1964

N. H. WRIGHT 3,154,387

CATALYTIC FUEL OXIDIZER FOR EXHAUST GAS TREATMENT

Filed Feb. 23, 1962

Nathaniel H. Wright
INVENTOR.

BY *Clarence A. O'Brien*
*and Harvey B. Jacobson*
Attorneys

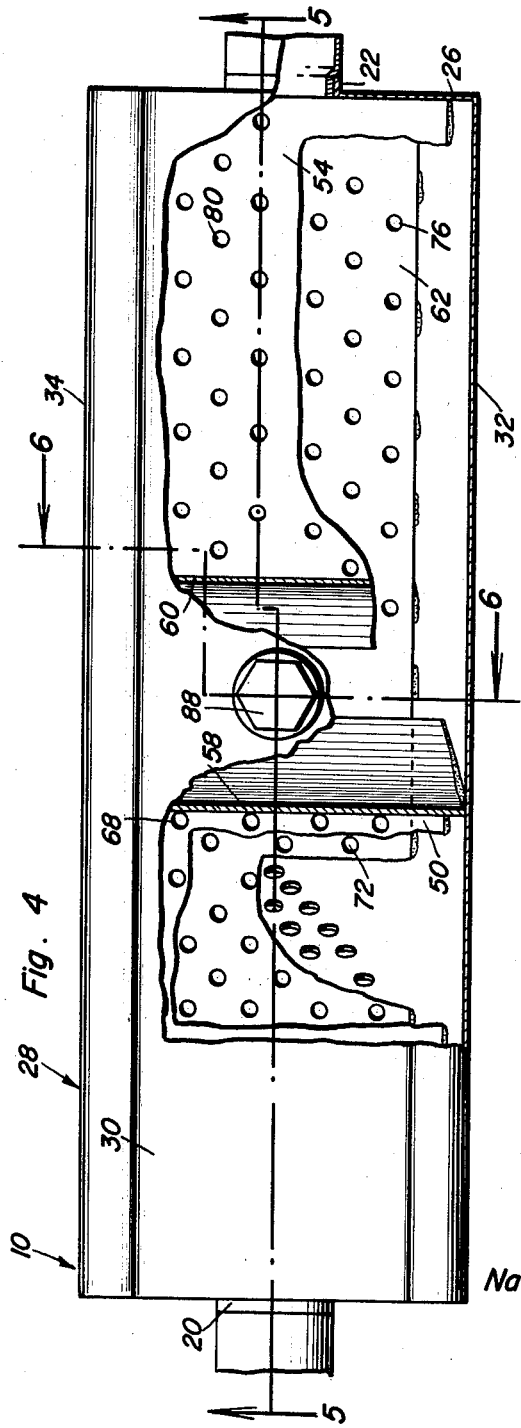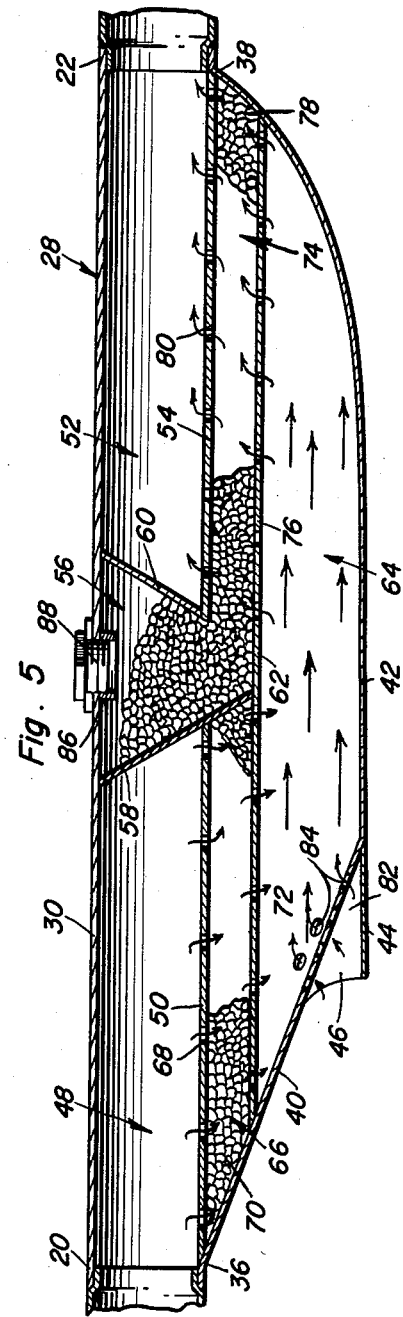

United States Patent Office 3,154,387
Patented Oct. 27, 1964

3,154,387
CATALYTIC FUEL OXIDIZER FOR EXHAUST
GAS TREATMENT
Nathaniel H. Wright, 411 13th Ave., Eastman, Ga.
Filed Feb. 23, 1962, Ser. No. 175,210
7 Claims. (Cl. 23—288)

This invention relates to a fuel exhaust oxidizer for preventing pollution of air by the carbon monoxide exhaust of internal combustion engines which propel automotive vehicles.

The present invention is concerned with the increased pollution of air resulting from the increased use of motor vehicles by virtue of which tremendous amounts of carbon monoxide gas is injected into the atmosphere that people inhale. The air pollution by such polluting materials as carbon monoxide gas, has risen to such magnitude, that serious concern has been expressed as to the public's health. Accordingly, many devices have been proposed for reducing the discharge of polluting material into the atmosphere particularly by the exhaust from the automotive vehicles. It is therefore a primary object of the present invention to provide such a device which may be not only manufactured with great economy so that installation of the devices may become economically feasible for wider distribution purposes, but also to provide a device which will more completely eliminate carbon monoxide as a pollutant and will also require a minimum of maintenance, repair and replacement.

Another object of this invention is to provide a novel oxidizer construction utilizing a particulate catalyst to trigger the reaction between the carbon monoxide and oxygen in a secondary flow of air relying upon the heat retained in the exhaust gas flow to support the reaction. The flow of gases through the oxidizer is such as to insure the more complete reaction under the reaction conditions.

A further object of the present invention is to provide an oxidizer construction wherein the exhaust gases from the internal combustion engine are preconditioned prior to catalytic triggered reaction so as to remove lead ingredients which would ordinarily coat the particles of the catalyst and thereby reduce its catalytic action, eventually stopping the catalytic action. The oxidizer device therefore involves less maintenance since replacement of the catalyst may be more infrequent.

An additional object of the present invention is to provide a novel oxidizing construction which in addition to its compact and rugged nature, will also more completely cause oxidation of carbon monoxide by expansion thereof within an inlet chamber portion for restricted flow through a lead arrestor followed by mixing with secondary air within the restricted mixing passage before passage through the catalyst and entry into a cross-sectionally enlarged outlet chamber providing sufficient reaction space for the collection of reaction end product carbon dioxide.

Other objects of the present invention include the provision of an air scoop for collecting secondary air, disposed forwardly of the rearwardly converging mixing passage projecting below the oxidizer device to conduct flow of exhaust gases and assist mixing thereof with the secondary air before entry into the outlet chamber through the catalyst particles which trigger the reaction resulting in the formation of non-polluting carbon dioxide.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is an enlarged top plan view of the oxidizer with parts broken away and shown in section.

FIGURE 5 is a longitudinal sectional view of the oxidizer taken substantially on the plane indicated by section line 5—5 in FIGURE 4.

Figure 1:
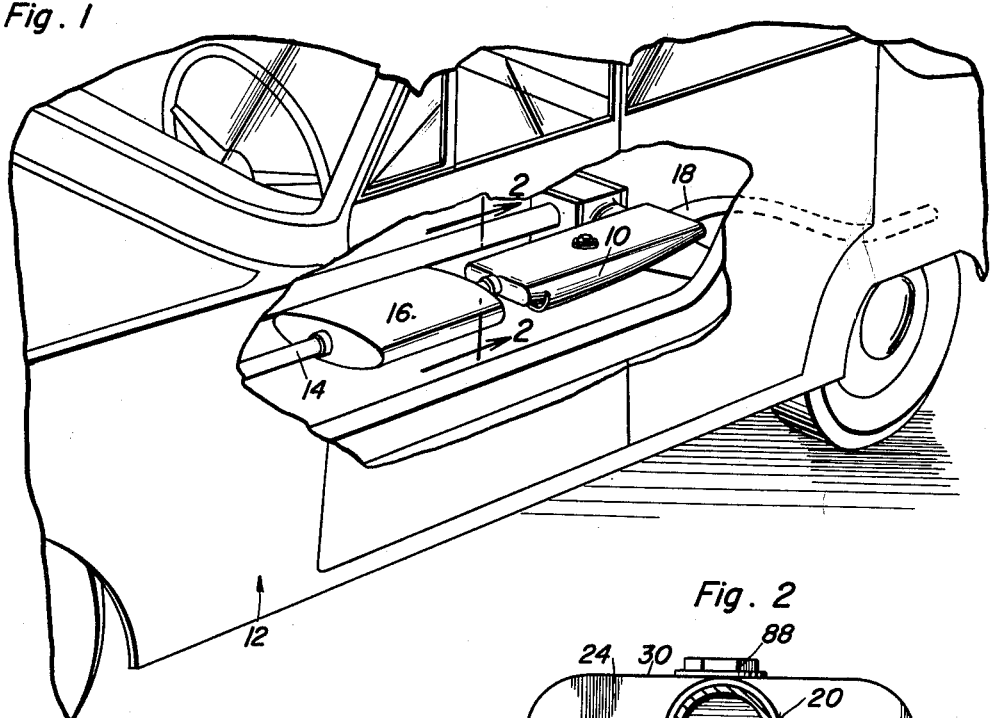
FIGURE 1 is a partial perspective view of an automotive vehicle with parts broken away to illustrate a typical installation for the catalytic fuel oxidizer of the present invention.
Figure 2:
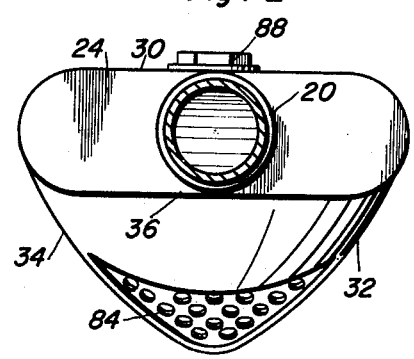
FIGURE 2 is a front view of the catalytic oxidizer as viewed from a plane indicated by section line 2—2 in FIGURE 1.
Figure 6:
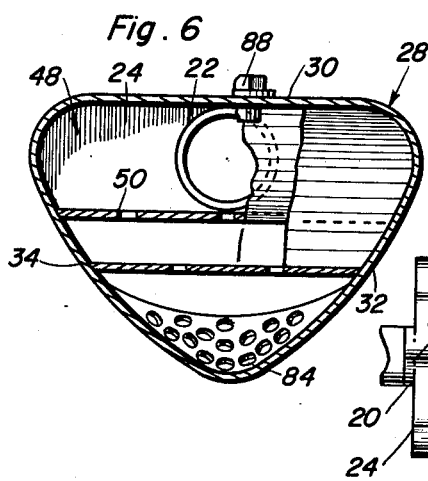
FIGURE 6 is a transverse sectional view taken substantially through a plane indicated by section line 6—6 in FIGURE 4.
Figure 3:
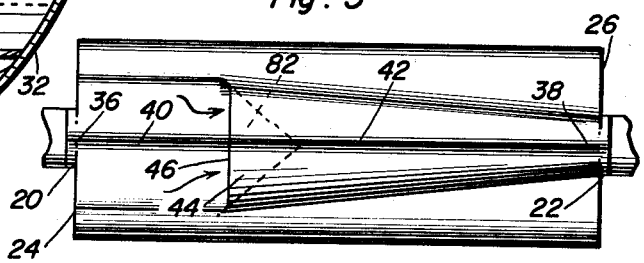
FIGURE 3 is a bottom plan view of the catalytic oxidizer.

Referring now to the drawings in detail, it will be observed that the catalytic oxidizer device generally referred to by reference numeral 10 is installed within an automotive vehicle generally referred to by reference numeral 12, the internal combustion engine of which is a source of pollutant in the form of carbon monoxide exhaust gas discharged through the exhaust pipe 14, the muffler 16 and finally out the tail pipe 18. It will be observed, that the pollution preventing oxidizer 10 is installed between the muffler 16 and the tail pipe 18 so that the carbon monoxide exhaust gas may be converted into non-polluting carbon dioxide before discharge from the tail pipe 18. The device 10 is provided with a cross sectionally circular inlet end 20 for connection to the outlet portion of the muffler 16 as shown in FIGURE 1, the device 10 being also provided at its opposite longitudinal end, with an outlet end 22 which is cross sectionally circular for connection to the tail pipe 18. As seen in FIGURES 2 through 6, the inlet end portion 20 of the device 10 is connected to a front wall 24 while the outlet end portion 22 is connected to a geometrically similar rear end wall 26. The end walls 24 and 26 are connected to an external housing member 28 that may be integrally formed including a substantially flat top portion 30 and curved downwardly converging side portions 32 and 34. The side walls 32 and 34 converge from the upper flat wall 30 from a maximum depth intermediate the end walls 24 and 26 toward a flat bottom portion 36 at the end wall 24 and a flat bottom portion 38 at the end wall 26. Accordingly, the bottom portion of the housing 28 as more clearly seen in FIGURE 5, includes a sharp rearwardly inclined portion 40 terminating at a substantially horizontal portion 42 of maximum depth which more gradually curves toward the rear end portion 38. As more clearly seen from FIGURES 5 and 3, the bottom portion 40 of the housing supports an air scoop formation 44 forming an inlet opening 46 for receiving secondary air, said air scoop formation 44 being disposed forwardly of the bottom portion 42 but rearwardly spaced from the inlet end of the device.

Formed within the housing 28, is an elongated conduit portion axially aligned between the inlet and outlet end portions 20 and 22 in substitution for the section of tail pipe necessarily removed for installation of the device 10. The elongated conduit is therefore formed from an inlet chamber section generally referred to by reference numeral 48 defined between the top portion 30 of the housing 28 and an apertured retaining member 50. The inlet chamber 48 is cross sectionally expanded with respect to the inlet portion 20 in a horizontal direction so that carbon monoxide exhaust gas entering will expand into the larger flow conduit so formed. The outlet chamber 52 is similarly formed between the top wall portion 30 of the housing member 28 and a longitudinally spaced apertured retaining member 54. The outlet chamber 52 constitutes a reaction chamber of sufficient volume to permit the continuous reaction aforementioned to proceed without retardation because of space limitation. The inlet and outlet chambers are separated and spaced from each other by means of a catalyst storing hopper 56 defined between a flow detouring wall 58 which extends transversely within the housing member 28 and a rear wall 60 closing the forward end of the outlet chamber 52. The forward flow detouring wall 58 of the hopper 56, extends downwardly below the rear wall 60 terminating at a longitudinally elongated apertured retaining member 62 that is parallel to the retaining members 50 and 54 and extends completely from one longitudinal end to the other of the housing member 28 and transversely thereacross so as to define therebelow a flow mixing passage 64 the cross sectional area of which is reduced with respect to the inlet and outlet chambers 48 and 52 and further reduces in a rearward direction. The retaining members 50, 54 and 62 thereby space the mixing passage 64 from the inlet and outlet chambers establishing a heat transfer barrier to reduce loss of heat energy from the hot exhaust gases in the inlet chamber 48.

The flow mixing passage 64 communicates with the inlet chamber through a protective conditioning means generally referred to by reference numeral 66 which includes the retaining member 50 and the forward portion of the retaining member 62 on the forward side of the flow detouring wall 58. Exhaust gas from the inlet chamber 48 will accordingly flow through the apertures 68 in the top retaining member 50 and through a layer of alumina pellets 70 to finally exit through the apertures 72 into the flow mixing passage 64. The bottom portion 40 of the housing and the flow detouring wall 58 thus constitute flow converging walls for conducting the flow of exhaust gases from the inlet chamber 48 into the mixing passage 64. The exhaust gases must however pass through the alumina pellets which constitute lead arrestors for removal of lead ingredients from the exhaust gases. The exhaust gases are therefore preconditioned so as to avoid the coating of the catalyst particles which subsequently come in contact with the exhaust gases.

The reaction triggering means generally referred to by reference numeral 74 includes particles of catalytic materials such as vanadium pentoxide ($V_2O_5$) confined between the retaining member 54 and the rear portion of the retaining member 62 on the rear side of the flow detouring wall 58. Accordingly, a mixture of the exhaust gases and secondary air from the mixing passage 64 will pass through the apertures 76 and through the layer of catalytic particles 78 to finally exit through the apertures 80 in the retaining member 54. A reaction will thereby be triggered between the exhaust carbon monoxide gas which is still at an elevated temperature and the oxygen in the secondary air resulting in carbon dioxide reaction products. The reaction will move to completion within the space of the outlet chamber 52 and finally discharge the non-polluting carbon dioxide from the outlet end portion 22.

The reaction supporting oxygen supplied by the secondary air mixed with the exhaust gases within the mixing passage 64, is supplied to the mixing passage 64, by the air collection chamber 82 defined between the rearwardly inclined wall portion 40 of the housing member 28 and the air scoop formation 44. The air collection chamber 82 communicates with the mixing passage 64 through a plurality of apertures 84 formed in the portion of the rearwardly inclined bottom wall 40 exposed through the inlet opening 46 of the air collection chamber 82. Secondary air will accordingly be drawn into the passage 64 by virtue of the flow of gases therethrough and also by virtue of the forward movement of the vehicle in which the device 10 is installed. A sufficient quantity of reaction supporting oxygen will thereby be made available for mixing with the exhaust gases.

The catalytic reaction producing means 74 will be maintained with a supply of the catalytic materials 78 from the catalyst storing hopper 56 defined between the downwardly converging walls 58 and 60. Vibration and forward movement of the vehicle on which the device 10 is installed will accordingly cause the catalytic material to move from the hopper 56 into the layer space between the retaining members 54 and 62 in order to fill up any voids that may develop. The hopper 56 may therefore be conveniently recharged at infrequent intervals through an opening 86 in the top wall 30 of the housing member 28 in which the threaded closure element 88 is disposed.

From the foregoing description, operation of the oxidizer will be apparent. It will therefore be appreciated, that carbon monoxide carried in the exhaust gases from an internal combustion engine, with which the device 10 is associated, will enter into the expanded volume of the inlet chamber 48 and be conducted between the converging passage walls 58 and 40 through the arrester means 66 to remove the catalyst coating lead from the exhaust gases that may otherwise eventually stop the catalytic action. The exhaust gases containing the carbon monoxide will then pass into the flow restricting mixing chamber 64 wherein it will be mixed with secondary air supplied thereto through the air scooping collection chamber 82. The carbon monoxide gas will accordingly be supplied with a sufficient quantity of reaction supporting oxygen so that when the mixture passes through the catalytic reaction producing means 74 disposed in the path of the gases, a continuous reaction will be triggered proceeding to completion within the outlet chamber 52 wherein the reaction products in the form of carbon dioxide may collect and be discharged through the outlet portion 22. Thus, the oxidizer device 10 of the present invention in addition to presenting a structurally rugged and compact article will also advantageously conduct the flow of gases through a lead arrester and completely through a catalytic reaction producing means to more completely remove air pollutants from the exhaust gases of internal combustion engines. The arrangement of the flow mixing passage 64 spaced below but in fluid communication with the flow conduit portions of the device to establish a heat transfer barrier, as well as the restricted collection chamber for supply of external secondary air, will avoid any undue reduction in temperature of the exhaust gases so that sufficient heat energy will be available to support the reaction under the conditions made available, producing a medium blue flame at a temperature of 600° F. to 1500° F. assuring thorough oxidation of all hydrocarbons in the fuel exhaust.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fuel exhaust oxidizer for preventing air pollution by exhaust gases from internal combustion engines or the like comprising, first elongated conduit means opening in a direction to communicate with a source of exhaust gases, second elongated conduit means providing a reaction chamber wherein purification of said exhaust gases takes place, said second conduit means opening to the atmosphere for discharging said purified gases, flow detouring means disposed between said first and second conduit means for directing exhaust gases below said first conduit means and preventing said exhaust gases from directly entering said second conduit means, filter means including alumina pellets disposed below said first conduit means and communicating therewith for filtering out catalyst coating agents present in said exhaust gases, a gas mixing chamber disposed below said flow detouring means and said filtering means but communicating with the latter, air intake means communicating with said mixing chamber and opening in the same direction as said first conduit means for admitting atmospheric air to the interior of said mixing chamber to mix with said exhaust gases, reacting producing means including a catalyst confined in a chamber disposed in the path of the flow of said mixed gases from said mixing chamber and communicating with said second conduit means whereby the mixture of gases will be caused to chemically react as it passes through said catalyst chamber, said reaction reaching completion in said second conduit means.

2. The oxidizer of claim 1 wherein a portion of said catalyst confining chamber comprises said flow detouring means.

3. The oxidizer of claim 1 wherein said catalyst comprises vanadium pentoxide.

4. The oxidizer of claim 1 wherein said air intake means includes an air scoop secured to and communicating with said gas mixing chamber.

5. A fuel exhaust oxidizer for treatment of exhaust gases containing catalyst coating ingredients discharged from a fuel combustion source comprising, an elongated conduit having an inlet end and an outlet end, said inlet end being connected to said source of exhaust gases and said outlet end opening to the atmosphere, flow detouring means disposed within said conduit between said inlet and outlet ends to define an inlet chamber communicating with the inlet end and an outlet chamber separated from the inlet chamber and communicating with the outlet end, mixing passage means connected to said conduit to form a mixing chamber extending between said inlet and outlet chambers in spaced relation thereto, air intake means connected to said mixing passage means in spaced relation to the outlet chamber for admitting a restricted flow of atmospheric air into the mixing chamber, flow conducting retainer means mounted between the conduit and the mixing passage means for spacing the mixing chamber from the inlet and outlet chambers to establish a heat transfer barrier between the mixing chamber and the conduit on opposite sides of the flow detouring means, an oxidizing catalyst material confined within said retainer means between the outlet chamber and the mixing chamber for passage of a mixture of air and exhaust gases therethrough, and an ingredient flow arrestor material confined within the retainer means between the inlet chamber and the mixing chamber for removal of said catalyst coating ingredients from the exhaust gases passing therethrough.

6. The combination of claim 5 including, storage chamber means mounted on the flow detouring means between the inlet and outlet chambers and communicating with the retainer means for maintaining the retainer means filled with one of said materials confined therewithin.

7. The combination of claim 6 wherein said air intake means comprises, an air scoop mounted on the mixing passage means in spaced relation to the conduit, and apertures formed in the mixing passage means between the air scoop and the mixing chamber for restrictive flow of air into the mixing chamber.

References Cited in the file of this patent

UNITED STATES PATENTS

| | | |
|---|---|---|
| 1,402,814 | Wachtel | Jan. 10, 1922 |
| 1,465,904 | Herdle | Aug. 21, 1923 |
| 1,522,111 | Franck-Philipson | Jan. 6, 1925 |
| 1,756,897 | Bilsky | Apr. 29, 1930 |
| 1,867,325 | Neville | July 12, 1932 |
| 2,004,865 | Grison | June 11, 1935 |
| 2,071,119 | Harger | Feb. 16, 1937 |
| 2,308,059 | Decker | Jan. 12, 1943 |
| 2,909,415 | Houdry | Oct. 20, 1959 |
| 2,942,932 | Elliott | June 28, 1960 |
| 3,025,133 | Robinson et al. | Mar. 13, 1962 |
| 3,045,422 | Houdry | July 24, 1962 |
| 3,056,662 | Ridgway | Oct. 2, 1962 |
| 3,061,416 | Kazokas | Oct. 30, 1962 |
| 3,072,457 | Bloch | Jan. 8, 1963 |

FOREIGN PATENTS

| | | |
|---|---|---|
| 911,490 | Germany | May 17, 1954 |